UNITED STATES PATENT OFFICE.

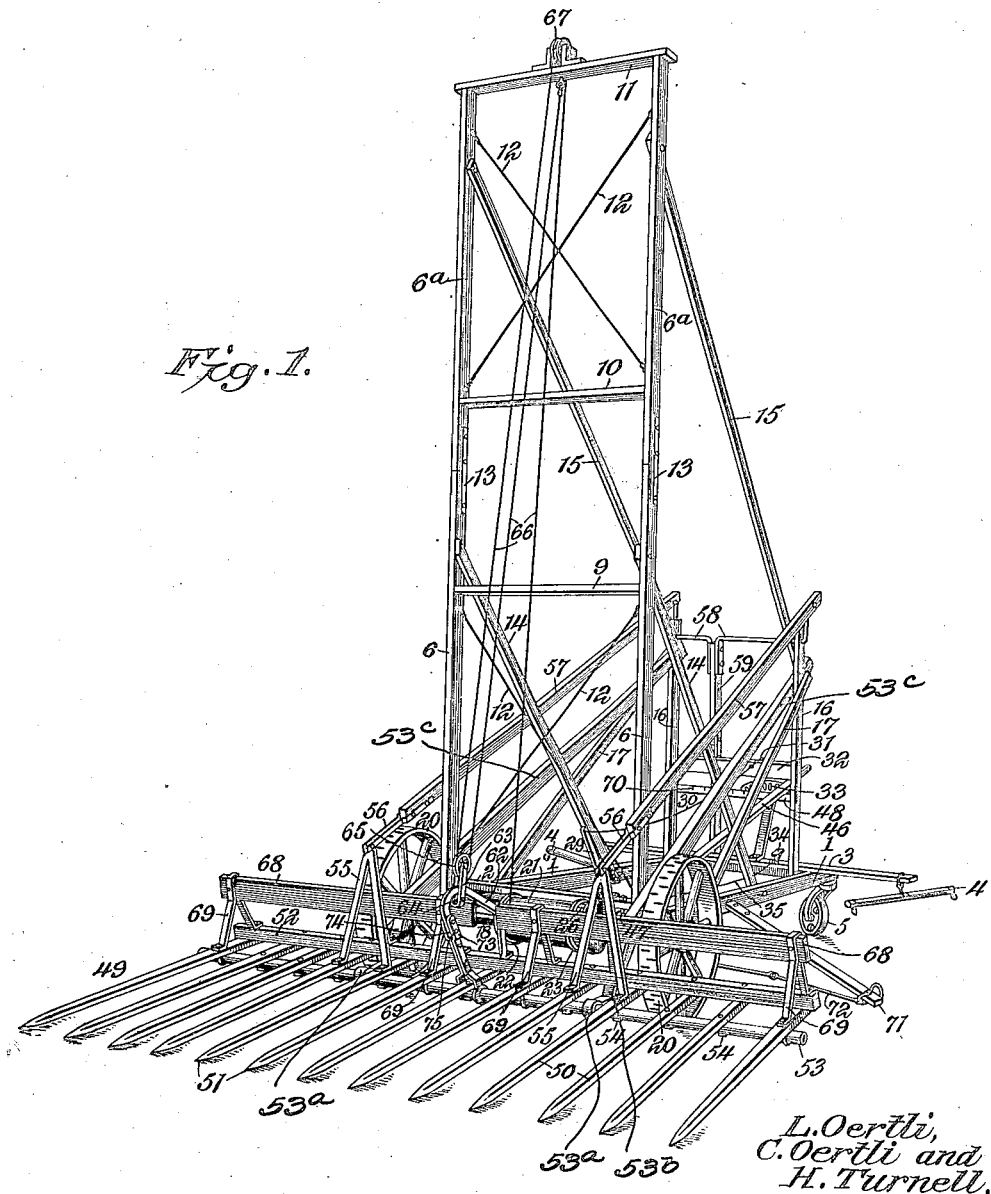

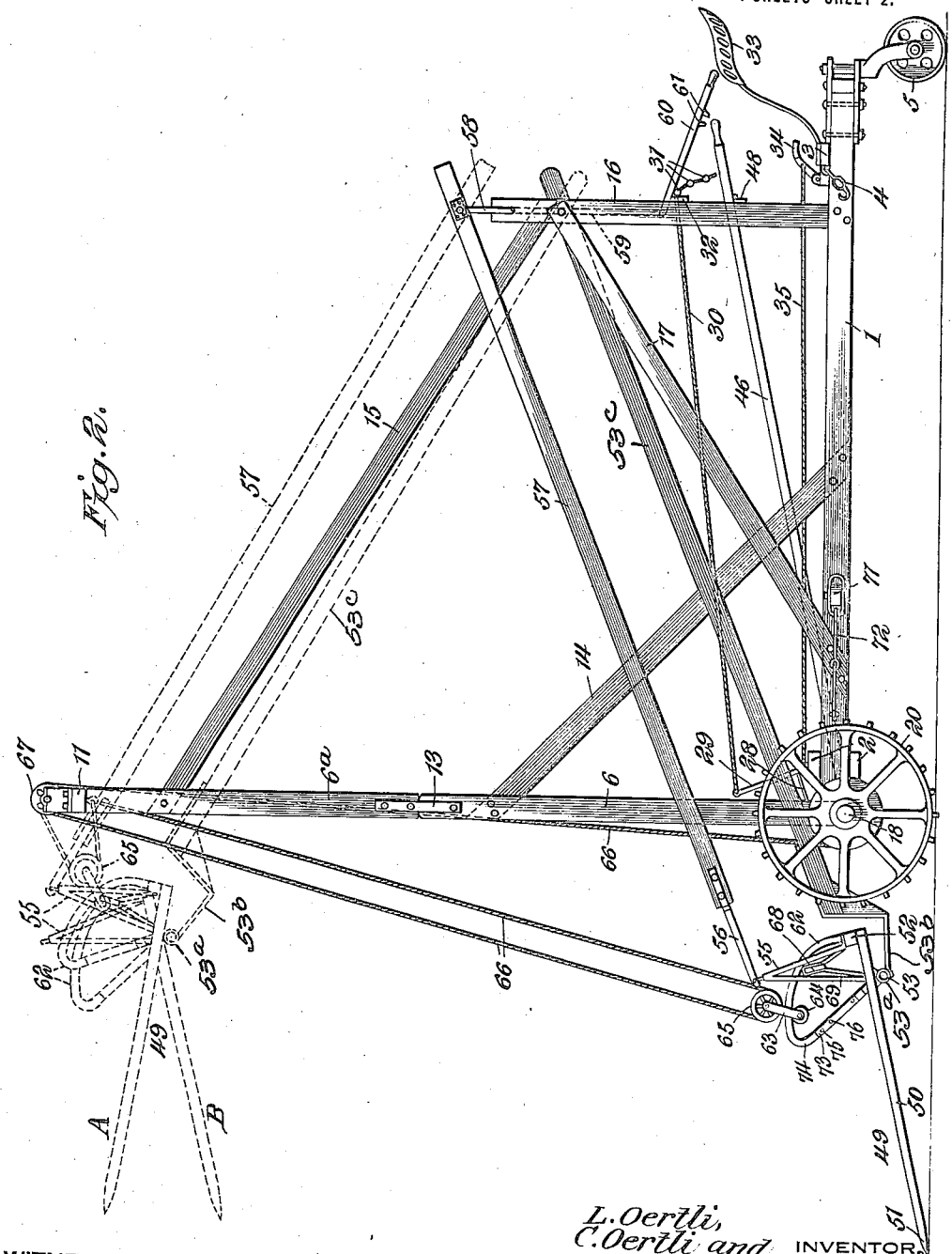

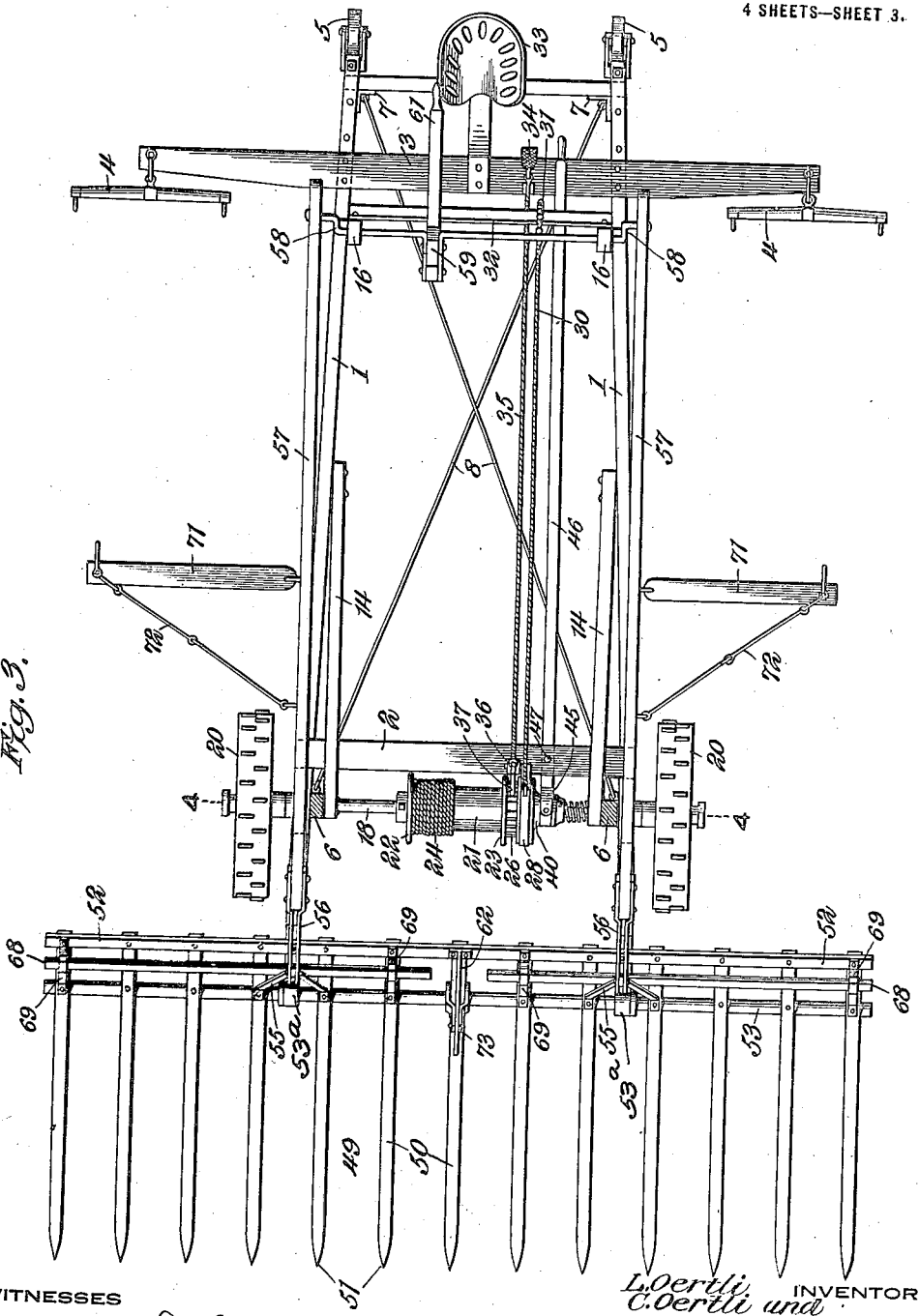

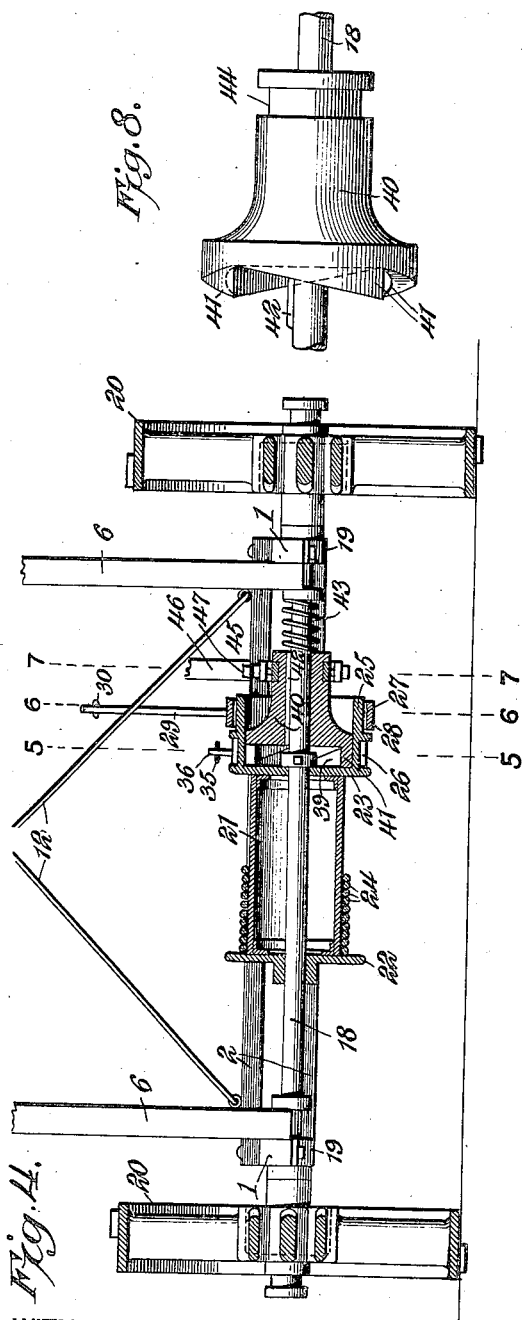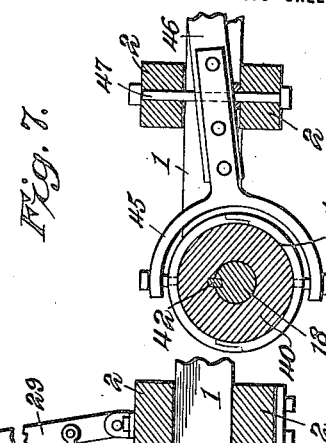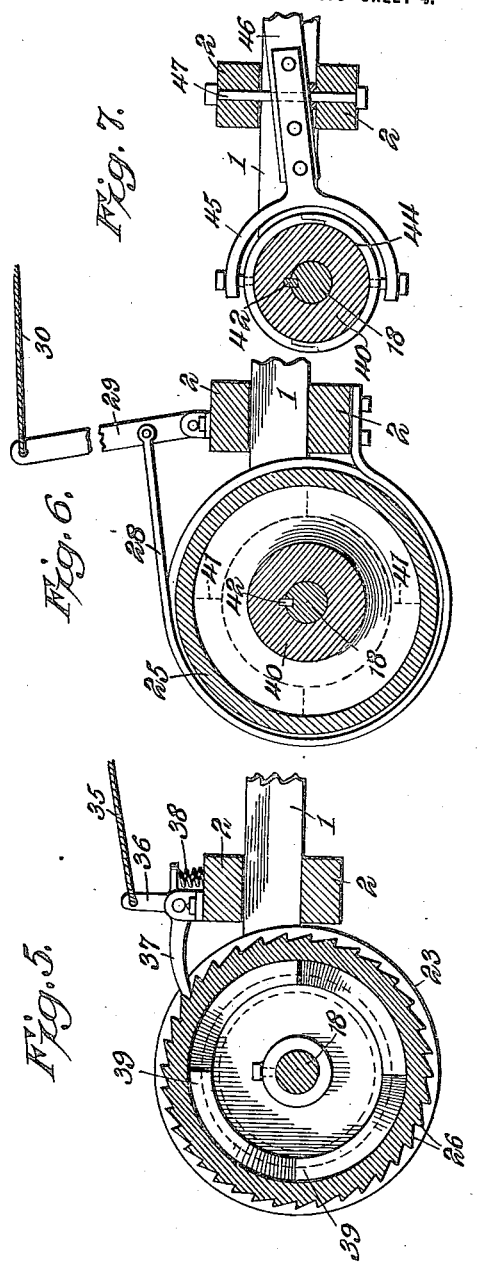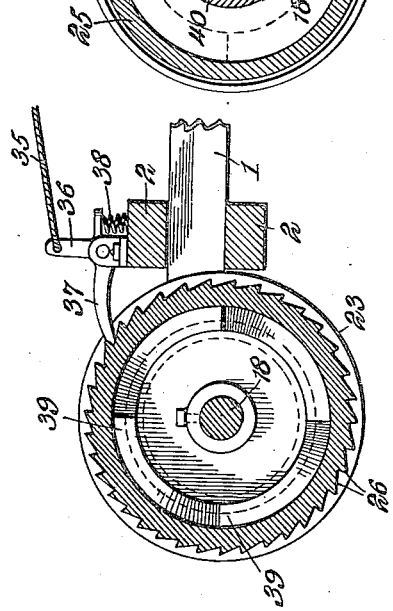

LUCY OERTLI AND CASPER OERTLI, OF HAMILTON, MONTANA, AND HENRY TURNELL, OF ELM CREEK, NEBRASKA.

AUTOMATIC HAYSTACKER.

1,422,611. Specification of Letters Patent. Patented July 11, 1922.

Application filed July 13, 1920. Serial No. 395,840.

*To all whom it may concern:*

Be it known that LUCY OERTLI and CASPER OERTLI, citizens of the United States, residing at Hamilton, county of Ravalli, State of Montana, and HENRY TURNELL, a citizen of the United States, residing at Elm Creek, in the county of Buffalo and State of Nebraska, have invented a new and useful Automatic Haystacker, of which the following is a specification.

This invention has reference to automatic haystackers, and its object is to provide a simple and particularly efficient stacker capable of gathering hay in different conditions from the field and depositing it upon the stack at a desired point, the stacker being built for propulsion either by draft animals or mechanical power means, and so constructed that the stacker may be collapsed to a condition of little height when not in use as a stacker.

Furthermore, the invention is designed to produce a machine for the purpose which may be built at moderate cost and by which the labor of operating it is reduced to a minimum, thus permitting the handling of the machine and of the material gathered to be markedly increased in speed. Furthermore, the hay may be gathered from the field either in the windrow or cock, and, when the hay is heavy enough, it may be even taken from the swath.

In accordance with the invention the frame of the stacker is built in such proportion and so balanced as to counterbalance the load, and gathering teeth are provided to lift the load and maintain the position of the teeth, thus avoiding accidental discharge of the load.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 1 is a perspective view of the haystacker in position to be propelled over a field to gather hay therefrom preparatory to elevating the gathered hay.

Fig. 2 is a side elevation of the machine shown in Fig. 1 with the position of the rake or teeth when lifted shown in dotted lines.

Fig. 3 is a plan view of the structure shown in Fig. 1 with some parts in cross section.

Fig. 4 is a section in most part on the line 4—4 of Fig. 3 and drawn on a larger scale.

Fig. 5 is a section on the line 5—5 of Fig. 4.

Fig. 6 is a section on the line 6—6 of Fig. 4.

Fig. 7 is a section on the line 7—7 of Fig. 4.

Fig. 8 is an elevation of one of the clutch heads.

Referring to the drawings there is shown a frame composed of longitudinal side beams 1 and end cross beams 2, 3, respectively, the side beams approaching from front to rear and the cross beam 3, which is the rear cross beam, is prolonged at the ends beyond the side beams and there carries single trees 4 for the attachment of draft animals.

The side beams 1 are continued rearwardly beyond the cross beam 3 and at the rear end of each side beam there is mounted a castor wheel 5 permitting the easy turning of the machine within a relatively small space and at the same time providing a stable support for the rear portion of the machine.

The bed frame of the machine composed of the side beams 1 and end beams 2 and 3 is provided near the front end with uprights or posts 6 and the bed frame is made rigid by means of corner irons 7 connected by diagonal brace rods 8. Each post 6 has a continuation 6ª. The posts 6 are connected together by cross pieces 9 and the continuations 6ª are connected together by cross pieces 10 and 11 respectively. The posts 6 and 6ª with their connecting parts constitute two joined frames which, when operatively related, are in alinement and stand substantially upright to a considerable height. Each frame, including the uprights or posts 6 and 6ª, is made rigid laterally by cross bars or braces 12. The two frames composing the upright frames are connected together where meeting about midway of the height of the connected frames by hinges 13, permitting the upper member of the frames to be folded down toward the main frame of the machine for the purpose of collapsing the machine for transportation or storage. The posts 6 are permanently connected to the side members 1 of the main frame by brace bars 14, while the upper post extensions 6ª are connected by brace bars 15 to other posts or uprights 16 rising from the rear end portion of the side beams 1 of the main frame close to the end cross beam 3, the posts 16 rising to a height approximating that of the posts 6. The posts 16 are braced by forwardly extending diagonal bars 17 made fast at the forward end to the side beams 1 and at the rear end to the posts 16 near the upper ends of the latter. There is thereby produced a rigid frame rising from the main or base frame of the machine and made rigid by the braces 14, 15 and 17. When collapsed the frame braces 15 are disconnected from the posts 6ª, thus permitting the frame member including the posts 6ª to be folded about the hinges 13 toward the posts 16 until arrested.

The forward end of the main frame of the machine is supported on a shaft or axle 18 mounted near the ends in journal bearings 19 carried by the side beams 1 and in front of the cross beam 2. The axle at the outer ends carries traction wheels 20 which may be of common type. Mounted on the shaft 18 is a winding drum 21 with a flange head 22 at one end and another flange head 23 at the other end. The heads 22 and 23 define a winding space on the drum 21 for the reception of a rope or cable 24 for lifting certain parts to be described. The head 23 is provided with a hollow drum-like extension 25, of which the outer surface is formed into a circular series of ratchet teeth 26, and beyond this the extension 25 has a smooth portion 27 surrounded by a brake-band 28 fast at one end to the cross beam 2 and at the other end to a lever 29 mounted on the cross beam 2. One end of a rope or cable 30 is made fast to the lever 29 and the other end of the rope 30 is continued to the rear of the machine and is there provided with a series of enlargements 31 capable of being engaged in a holding strip 32, whereby the brake may be joined and held in the joined position. This operation is performed by a person supported by a seat 33 carried by the cross beam 3 with the seat so situated that the person may readily reach the rope or cable 30.

Within ready access of the person on the seat 33 is a pedal 34 connected by a rod or strand 35 to a latch lever 36 mounted on the cross beam 2, and having a tooth or pawl 37 normally held in the path of the ratchet teeth 26 by a spring 38. The pawl 37 may be lifted out of the path of the teeth 26 by pressure of the foot of the operator or person in the seat 33 engaging the pedal 34.

Within the hollow drum 25 at the end thereof adjacent to the drum 21 is a circular series of clutch teeth 39, and mounted on the shaft 18 within the drum extension 25 is a head 40 with clutch teeth 41 matching the teeth 39 so that on turning the shaft 18 in one direction it may be caused to correspondingly rotate the head 40 but when the shaft 18 is rotated in the opposite direction the teeth 41 will idly pass the teeth 39. The head 40 is constrained to turn with the shaft 18 by means of a spline or key 42. The head 40 is normally urged toward the teeth 39 by an expansion spring 43 located between the head 40 and the adjacent bearing 19 of the shaft 18. The head 40 is formed at the end remote from the teeth 41 with a circumferential groove 44 engaged by a fork device 45 carried by one end of a rock lever 46 mounted on a pivot pin 47 carried by the cross beam 2. The other end of the lever 46 is extended toward the rear of the machine close to the seat 33 and is there upheld by a suitable cross strip 48 permitting the lever to be rocked laterally to shift the teeth 41 of the head 40 into and out of operative relation with the teeth 39.

At the front of the hay-gathering machine there is located a gathering and elevating rake 49 made up of a series of elongated teeth 50 each with a pointed end 51, and which at the end remote from the points are secured to a transverse bar 52 extending across the machine for about the full width of the latter. The teeth are spaced apart an appropriate distance, and forwardly of but adjacent to the bar 52 the teeth are secured to a rod 53 which latter may be hollow to contribute to lightness and strength. Each tooth is made fast to the rod 53 by a clip bolt 54 or in any other appropriate manner.

The rod 53 is rotatably mounted in eyes 53ª formed in the forwardly extending arms of brackets 53ᵇ which are secured to the forward ends of normally inclined rake supporting bars 53ᶜ. These bars are pivotally connected at their rear ends to the uprights 16, below the top of the latter, and are adapted when lowered to rest upon the forward ends of the sills 1 to support the weight of the rake, together with the load of hay carried thereon, and to be elevated with the rake as indicated in dotted lines in Fig. 2.

At spaced points the rods 52 and 53 support the upstanding brackets 55 pivotally connected to the outer ends of metallic bars 56 projecting from the forward ends of the respective bars 57 extending toward the rear of the machine. Each bar 57 is pivotally connected to a crank 58 and the cranks are made fast to a link 59 dropping to a level about that of the strip 32. At the lower end of the link 59 a manipulating handle or lever 60 is pivoted and at its rear end is accessible to a person on the seat 33. The lever 60 has spaced blocks 61 on its lower edge to engage over the strip 32, and the parts are so positioned that the lever 60 may be moved forwardly and backwardly to rock the link 59 about a substantially horizontal axis to correspondingly rock the cranks 58 and impart forward or rearward motion to the bars 57 carrying the series of gathering teeth 49. The manipulation of the lever 60 results in tilting the teeth 50 from engagement with the ground to a short elevation thereabove, say about one foot.

About midway of the rod or pipe 53 there is mounted a peculiar shaped link connection 62 which, because of its form, may be termed a goose-neck. The end of the goose-neck remote from the hollow rod 53 is made fast to the bar 52 about midway of its length. The curved part of the goose-neck 62 is carried by straps 63 through which the goose-neck passes and these straps are provided with a roller or pulley 64 permitting the goose-neck to ride freely on the pulley. The straps 63 are carried by a roller or a wheel 65 sustained by a rope or cable 66 having one end fast to the cross strip 11, thence encircling the roller 65, then rising to and passing over a pulley 67 on top of the cross strip 11 and then dropping to the drum 21 about which the rope or cable 66 is wound and to which it is fastened.

When the machine is traveling over the field and the clutch faces of the teeth 39 and 41 are in engagement the drum 21 is rotated in the proper direction to wind the cable 66 on said drum so as to raise the rake 49. The elevating of the rake is not caused until the operator has gathered a load thereon by the forward movement of the machine.

While the load is being gathered the drum 21 is free from the axle 18, and during this time the lever 46 is so positioned as to hold the clutch head 40 with its teeth 41 disengaged from the teeth 39. As soon as a load has been gathered the drum 21 is clutched to the shaft 18 thus causing a lifting of the gathering rake 49 by means of the rope or cable 66. Such lifting action may be stopped at any point desired but if continued will ultimately raise the rake to the top of the post structure 6 and 6ª with the rake teeth tilted forwardly as shown in dotted lines at A in Fig. 2. This causes the retention of the load on the rake teeth while the escape of the gathered load rearwardly either during the gathering or during the transportation is prevented by a retaining board 68 mounted on the bar 52. The retaining board 68 is divided intermediate of its length to permit the passage of the goose-neck 62. The retaining or back board 68 is carried by pedestals or brackets 69 wherever necessary.

When the load has been lifted to the desired height the rake is held in such elevated position by the brake band 28 pulled tight by the strand 30 so that a suitable one of the enlargements 31 will seat in a notch in the strip 32.

When the clutch is operated by the lever 46 it is held in the clutched position by engaging in a notch 70 in the cross strip 48. The pedal or foot lever 34 is operated to control the locking or unlocking of the ratchet 26 and thus hold the rake in elevated positions or release it for lowering while the brake 28, under the control of the rope or cable 30 permits the operator to lower the rake rapidly or slowly as desired.

Projecting from the side beams 1 at an appropriate distance in front of the single trees 4 are neckyoke bars 71 held by links 72 to position the draft animals with relation to the single trees and as the side beams 1 approach toward the rear of the machine the draft animals have plenty of room in which to travel.

Provision is made for varying the pitch of the goose-neck 62. This may be accomplished by forming the goose-neck of two parts with one part provided with a yoke or socket 73 receiving an end portion 74 of the other part of the goose-neck. A series of holes 75 in the socket 73 permits the passage of a bolt or pin 76 in such manner that the part 74 may be adjusted lengthwise of the socket 73, thus varying the pitch of the goose-neck.

The dumping of the load is accomplished by pulling back the lever 60, thereby moving the arms 57 forwardly thus causing the teeth 50 to tilt downwardly from the position A to the position B, shown in dotted lines in Fig. 2, thereby dumping the load.

It is customary in machines of the character of this invention to provide drive wheels which on their forward movement will clutch the shaft or axle, but when the machine is moved backwardly or is turning a corner will release the axle, and is so common a practice that it is deemed unnecessary to either show or describe the construction.

One of the main advantages of this invention resides in the goose-neck 62 on which travels the roller 64 and carries the pulley 65, sustained by the rope or cable 66. As the teeth of the rake are raised or lowered, the roller moves along the inclined track of the goose-neck and thus eliminates any excessive pull or strain which would be the case if the connection between the cable 66 and the rake were a stationary one. Also in the dumping of the rake when the heel of the rake rises, the wheel 64 runs to the lower end of the goose-neck and makes the dumping of the rake easier. In machines of smiliar make, where the goose-neck is not employed, the dumping is made difficult because of the stationary pulley straining against the cable when the machine is raised too high. With the employment of the goose neck, the rake can be raised to the height of the uprights 6 and 6ᵃ without interfering with the capability of the rake to dump.

What is claimed is:

1. A haystaker comprising a vehicle, an upright frame erected on one end of the vehicle, said frame being hinged intermediate of its height, and upper and lower braces for holding the frame upright and permitting the folding of the upper section toward the lower section, the upper braces being disconnectible from the upper part of the frame.

2. A haystacker comprising a vehicle provided with drive wheels and an axle near one end, an upright frame erected on the vehicle directely over the axle and hinged intermediate of its height, to form an upper and lower section, said frame being composed of posts and connecting cross pieces, and braces for holding the frame sections upright and permitting the folding of the upper section of the frame toward the lower section thereof, the braces for the upper section being disconnectible therefrom.

3. A hay stacker comprising a vehicle having drive wheels and an axle near one end, a drum mounted on the axle, an upright front frame having a fixed lower section and a swinging upper section, a rigid rear frame, a gathering rake extending crosswise of the vehicle in front of the upright frame, means connected to the rake for pivotally supporting the same from the rear frame, a pulley carried by the upper section of the upright frame, a rope connected to the rake and passed over the pulley to the said drum, and braces connecting the upper section of the upright frame to the rear frame, said braces being disconnectible from said upper section.

4. In a haystacker a rockable gathering rake, a single pulley and rope structure for supporting and raising the rake, and a gooseneck guide associated with the pulley structure and shaped to control the rocking of the rake about a substantially horizontal axis for causing a controlled dumping movement of the rake.

5. A haystacker comprising a vehicle and gathering rake mounted thereon, a supporting frame along which the rake may be raised and lowered, a curved guide fast to the rake, a pivotal support for the rake, and hoisting means connected to the curved guide and movable therealong to cause limited tipping movements of the rake between loading, retaining and dumping positions.

6. In a haystacker, a rockable gathering rake, means for elevating the rake, and means for causing the automatic rocking of the rake to elevate the forward ends of the teeth of the rake, while being elevated, comprising a roller and a curved bar underridden by the roller and having a forward rising trend to cause the roller to tilt the rake by the approach of the roller toward the forward end or the curved bar.

7. In a haystacker a rockable gathering rake, means for elevating the rake, and means for causing the automatic rocking of the rake to elevate the forward ends of the teeth of the rake, while being elevated, comprising a roller and a curved bar underridden by the roller and having a forward rising trend to cause the roller to tilt the rake by the approach of a roller toward the forward end of the curved bar, said curved bar being formed of two adjustably connected parts whereby the pitch of the bar may be varied.

8. In a haystacker a drive axle, a winding drum mounted on the axle, a gathering rake carried by the stacker, a rope or strand carried by the winding drum for elevating the rake, a clutch for coupling the axle to the winding drum, a pawl and ratchet mechanism resistant to unwinding movements of the drum and having means under the control of an operator for releasing the drum to unwinding movements, and a brake under the control of the operator and active to the winding drum to restrict unwinding movements thereof when released from the pawl.

9. In a haystacker, a vehicle, an axle mounted thereon, traction wheels for rotating the axle and sustaining the vehicle, a superstructure mounted on the vehicle above the axle, a winding drum mounted on the axle to rotate thereon, said drum having a continuation at one end of its winding surface, clutch members on the axle and drum and movable in the extension into and out of clutching relation and provided with manipulating means continued to within reach of an operator, pawl and ratchet means carried by the drum and normally holding the latter against unwinding movements, a hay-gathering rake carried by the vehicle, a rope or cable connecting the rake to the drum for causing the lifting of the rake toward the top of the superstructure by the forward movement of the vehicle, and a brake also within reach of the operator for causing a controlled lowering of the rake at the will of the operator.

10. In a haystacker, a vehicle, a superstructure mounted thereon, a hay gathering rake mounted on and extending across the front of the vehicle, pivotally carrying means for the rake on opposite sides of the mid-point thereof, means for rocking the pivotal supports to vary the tilt of the teeth of the rake, a lifting means for the rake comprising a winding drum controlled by the travel of the vehicle, a single rope or strand extending to the top of the superstructure and connected to the winding drum, a forwardly curved frame or gooseneck connected to the intermediate point of the rake, and a pulley and roller device associated with the frame and under the control of the rope or strand, whereby the lifting of the rake will cause the latter to automatically rock to a limited extent about a horizontal axis.

11. In a hay stacker, a vehicle provided with wheels, an axle, an upright front frame erected on the vehicle, a gathering rake movable up and down along said frame, said rake being constructed to rock on a transverse pivot, a single pulley and rope structure for raising the rake, and means for movably connecting the pulley and rope structure to the rake for causing the shifting of the said connection forwardly and rearwardly to a limited extent on opposite sides of said pivot as the rake is elevated.

12. In a hay stacker, a frame or superstructure, bars pivotally connected to the rear end of the frame, a rake pivotally carried by the forward ends of the bars and extending crosswise of the hay stacker, other bars pivotally connected to the rake above the pivotal connection of the rake, means connected with the second-mentioned bars whereby the rake is rocked on its pivot, a pulley and rope structure for elevating the rake, and means between the pulley and rope structure and the rake for causing the automatic rocking of the rake to elevate the forward ends of the teeth of the rake while being elevated.

In testimony that we claim the foregoing as our own we have hereto affixed our signatures.

LUCY OERTLI.
CASPER OERTLI.
HENRY TURNELL.